May 12, 1964  J. H. KRITIKSON  3,132,849
COOKING UTENSIL STIRRER
Filed Oct. 18, 1960
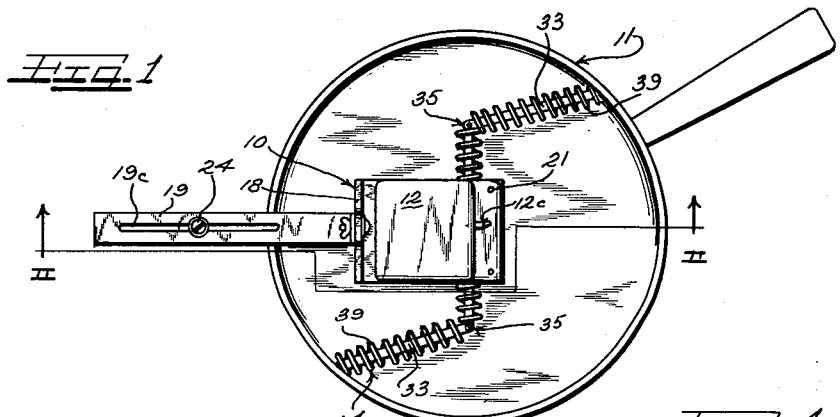
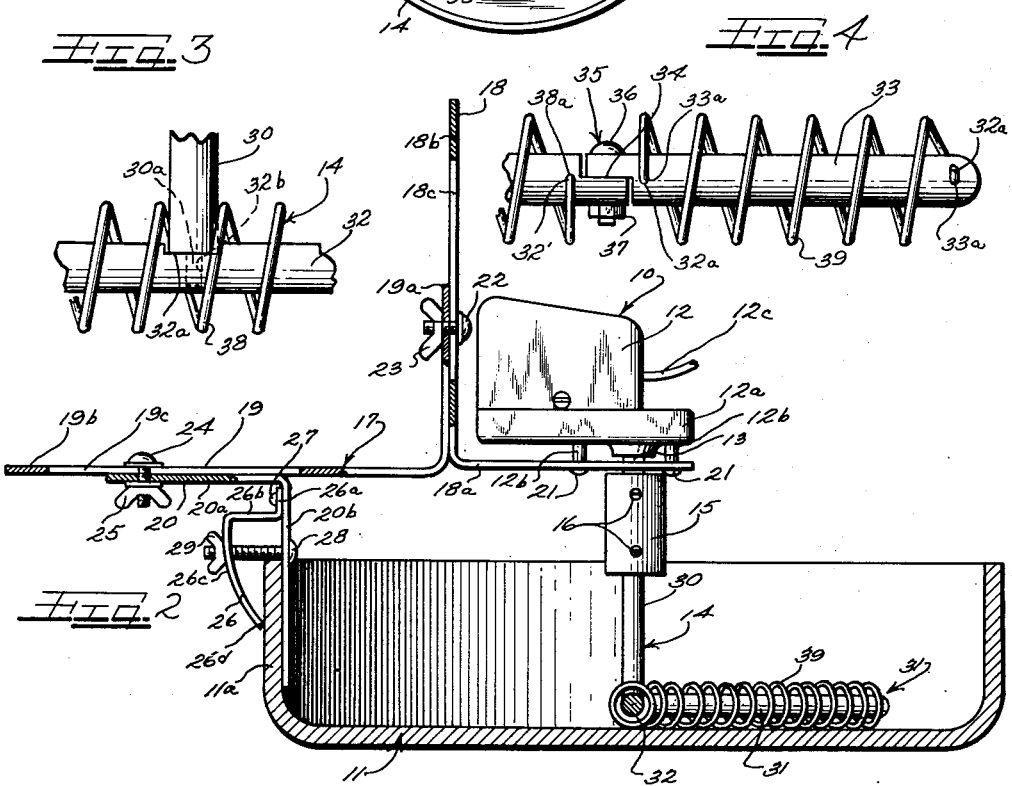
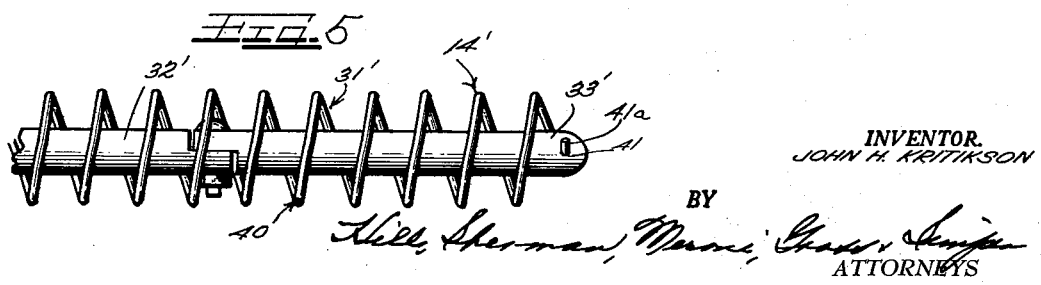
INVENTOR.
JOHN H. KRITIKSON
BY
ATTORNEYS

United States Patent Office 3,132,849
Patented May 12, 1964

3,132,849
COOKING UTENSIL STIRRER
John H. Kritikson, 211 N. Oak Park Ave., Oak Park, Ill.
Filed Oct. 18, 1960, Ser. No. 63,347
12 Claims. (Cl. 259—107)

The present invention relates generally to a pot stirring structure for a cooking receptacle. More specifically, the present invention relates to a motor driven pot stirrer which is adapted to be effectively used in different sized cooking receptacles.

In the preparation of various products, such as foods, it is necessary that ingredients be stirred over varying lengths of time. The instant pot stirring structure has a hot stirrer which is adapted to engage the bottom of a receptacle such as a cooking receptacle so that the contents of the receptacle may be stirred upon the rotation of the motor driven pot stirrer. The instant pot stirring structure has been found to be particularly well suited to use where, for example, heavy sticky type materials are to be mixed or stirred for a considerable length of time such as in the manufacture of fudge, hot cereals, puddings, tomato sauce or any other food requiring constant or occasional stirring.

An important object of the present invention is to provide a new and improved pot stirring structure.

Still another important object of the present invention is to provide a motor driven pot stirrer which can be used with cooking receptacles of varying size.

A still further object of the present invention is to provide a pot stirrer of the type that may be readily cleaned upon completion of the stirring operation.

According to the general features of the present invention there is provided a pot stirrer including a main support shaft having feet pivotally connected with the support shaft at its opposite ends and spring means being supported on and extended along the lengths of the support shaft and the feet, the spring means having coils for stirring the contents of a cooking receptacle during the rotation of the pot stirrer, the feet being swingable on the pivots to move angularly of the main support shaft to enable the effective stirring length of the support shaft and the feet to be varied so that the pot stirrer may be used in different sized cooking receptacles.

Still another important feature of the present invention relates to a pot stirring structure having a new and improved support structure which includes three L-shaped plates and a spring clip, the plates being connected together to permit vertical and radial adjustment and with the clip being cooperable with one of the plates to secure the pot stirrer structure in assembly with a cooking vessel.

A still further feature of the present invention relates to a pot stirring structure having a coiled spring extending the length of a main support having feet pivotally connected to the main support at its opposite end, the coils of the spring functioning as means to stir fluid contained within a receptacle.

Yet another object of the present invention is to provide a pot stirrer structure having a main support and a pair of feet pivotally connected at the opposite ends of the main support, the main support and the feet each having a spring integrally attached therewith.

Other objects and features of the present invention will more fully become apparent in view of the following detailed description taken in conjunction with the accompanying drawings illustrating several forms of the present invention, and in which:

FIGURE 1 is a plan view of a pot stirring structure mounted on a cooking receptacle;

FIGURE 2 is an enlarged fragmentary cross-sectional view taken substantially on the line II—II looking in the direction indicated by the arrow;

FIGURE 3 is an enlarged fragmentary view of the pot stirrer;

FIGURE 4 is an enlarged fragmentary view of another portion of the pot stirrer; and FIGURE 5 is an enlarged fragmentary view similar to FIGURE 4 only illustrating a modified type of pot stirrer.

As shown on the drawings:

The reference numeral 10 in FIGURE 1 indicates generally a pot stirring structure which is illustrated as being mounted on a cooking receptacle 11. The pot stirring structure 10 includes a motor 12 having a drive shaft 13. A pot stirrer 14 is secured to the drive shaft 13 by means of a coupling 15. The coupling is fastened with the drive shaft 13 and the pot stirrer 14 by means of the operation of set screws 16 to secure the coupling 15 in assembly therewith.

A support structure 17 is provided for supporting the motor 12 and for maintaining the pot stirrer in proper stirring position with respect to the cooking receptacle 11. To attain this end, the support structure 17 includes inner and outer L-shaped plates 18 and 19 and a third L-shaped plate 20. The radially inner plate 18 has an inner plate leg 18a fastened to a motor base 12a by means of three screws 21. Each of the screws 21 is threaded into a sleeve 12b which is integral with the motor base 12a.

The inner plate 18 further includes a vertical leg 18b which extends vertically above and below the motor 12. The radially outer plate has a radially outer vertical leg 19a which is slidable relative to the inner vertical leg 18b. In order to permit the outer L-shaped plate 19 to move relative to the inner L-shaped plate 18, the plate 18 has a vertical slot 18c and the outer vertical leg 19a carries a bolt 22 and a wing nut 23. The bolt 22 extends through the slot 18c and may be moved vertically in the slot to different positions and secured in any desired position by turning the wing nut 23 thereby clamping the vertical legs 18b and 19a in assembly together.

The radially outer L-shaped plate 19 further includes an outer plate leg 19b which extends radially outwardly a substantial distance from the radially inner plate 18. The outer plate leg 19b has a slot 19c for coaction with a bolt 24 and a wing nut 25 to secure a radial leg 20a on the third L-shaped plate in assembly therewith.

The L-shaped plate 20 also is provided with a vertical leg adapted for engagement with a side wall 11a of the cooking receptacle 11. Mounted upon the vertical leg 20b is a resilient spring clip 26. The clip 26 has a vertical attachment portion 26a which is fastened to the vertical plate leg 20b by means of a screw thereby securing the clip in assembly with the vertical leg 20b. The clip 26 is further provided with a spacer leg 26b disposed at right angles with respect to the attachment leg 26a. A resilient curved clip leg 26c is joined with the outer end of the spacer leg 26b. The resilient clip leg 26c has a biting edge 26d for engagement against the side wall 11a of the cooking receptacle 11. It will be appreciated the vertical leg 20b is adapted to be disposed on one side of the side wall of the receptacle while the biting clip edge 26d is adapted to be disposed on an opposite side of the side wall of the receptacle so that the clip 26 and the vertical side wall 20b may coact to clamp the pot stirrer structure 14 on the cooking receptacle 11.

In order to insure that the pot stirrer will be firmly held on the cooking receptacle 11, a bolt 28 is extended through the vertical plate leg 20b and through the resilient clip leg 26c and a wing nut 29 is fastened to the outer end of the bolt to draw the vertical plate leg 20b and the resilient clip leg 26c radially of one another so that the biting clip edge 26d may tightly engage the side wall 11a of the cooking receptacle 11.

In view of the foregoing discussion it will be appreciated how the pot stirring structure 10 may be mounted on receptacles of varying size. If the side wall of the pot or receptacle is higher than the one illustrated in FIGURE 2, the L-shaped plate 19 may be moved vertically on the L-shaped plate 18 by moving the bolt 22 in the slot 18c whereupon the wing nut 23 is drawn tight when the L-shaped plate 19 has reached the desired height. If the diameter of the cooking receptacle were larger or smaller than the diameter of the cooking receptacle illustrated, the L-shaped plate 20 may be moved radially of the L-shaped plate 19 by moving the bolt 24 in the slot 19c and by tightening the wing nut 25 when the desired setting has been made.

The pot stirrer 14 includes a vertical shaft 30 which is joined with the drive shaft 12b by means of the coupling 15. Disposed at the lower end of the vertical shaft 30 is a rotating arm indicated generally at 31. The rotating arm includes a main support shaft 32 and a pair of identical feet 33. The main support shaft has a recessed area 32a and a shaft pin socket 32b. The vertical shaft has its lower end bottomed in the recessed area 32a and has a pin 30a secured within the pin socket 32b joining the vertical shaft 30 with the main support shaft 32.

A lap type joint 34 is disposed at each end of the main shaft 33 at the juncture between the end of the main shaft 32 and a radially inner end of the associated foot 33. Each of the feet are pivotally secured with the main shaft 32 by means of a pivotal connection 35 which extends transversely through the lap joint 34. As illustrated, the foot 33 and the main shaft 32 are joined in assembly together by means of a bolt 36 and a nut 37.

Mounted on the main support shaft 32 is a coil type spring 38. The coil spring has its opposite ends 38a engaged in spring retainer recesses 32' disposed on the main support shaft 32 adjacent the latch joint 34, as shown in FIGURE 4. Each end of the coil spring 38 is secured to the main support shaft 32 in the same manner.

Each of the feet 33 has a coil spring 39 secured to it. The spring 39 has opposite ends 39a which are secured in spring retainer recesses 33a. The three springs 38 and 39, 39 function to mix the contents of the cooking receptacle 11 as the drive shaft 12b operates to rotate the stirring arm 31.

In FIGURE 5 is shown a modified stirring arm structure 31'. The stirring arm structure 31' includes a main support shaft 32' and a pair of feet 33'. The feet 33' are joined with the opposite ends of the main support shaft 32' in the same manner as previously described. Extended the full length of the main support shaft 32' and the feet 33' is a coil spring 40. The coil spring 40 has each of its opposite ends 40a secured in spring retainer recesses 41 carried on the feet 33'. The swingable arm 31' functions in the same manner as the swingable arm 31 except that by making the spring continuous over the entire length of the swingable arm, the spring serves an additional function. The spring 31' operates to automatically return the feet 33' from an angular position with respect to the main shaft 32' to a position whereby the main support shaft 32' and the feet 33' are disposed in a common plane with respect to one another. In other words, where the feet 33' are bent relative to the main support shaft 32' while disposed within a container or receptacle, and when the swingable arm 31' is removed from the receptacle, the spring 40 operates to automatically move the feet out of angular position with respect to the main shaft so that the feet and main shaft are disposed in a common plane with one another.

In summary, the pot stirrer structure may be readily clamped on the side wall of different sized receptacles and it may be placed in operation merely by connecting the motor electrical cord 12c with a source of electrical power.

The instant pot stirring structure may be simply and quickly attached or removed from a cooking pot in a few seconds. After the food has been cooked, the bottom of the pot is clean and does not require any scraping where the instant pot stirring structure had been used thus saving the homemaker or the cook a considerable amount of time. Still another advantage in the use of the instant pot stirring structure is that the person using the pot stirring structure in a cooking operation regardless whether in a hotel, restaurant or a home kitchen, can go about doing other work, while the pot stirring structure is in operation and this permits the cook to more efficiently use his time in the preparation of meals.

It will be understood that modifications and variations may be effected without departing from the scope of the novel concepts of the present invention.

I claim as my invention:

1. A pot stirring structure for a cooking receptacle having a motor including a drive shaft, a pot stirrer, and a coupling securing the drive shaft and the pot stirrer in driving engagement, said pot stirrer including a main support shaft having feet with pivots pivotally connecting the feet with the support shaft at its opposite ends and spring means being supported on and extended along the length of the support shaft and the feet, the spring means having spring coils for stirring the contents of the cooking receptacle during the rotation of the pot stirrer, the feet being swingable on the pivots to move angularly of the support shaft to enable the effective stirring length of the support shaft and the feet to be varied so the pot stirrer may be used in different sized cooking receptacles.

2. A pot stirring structure for a cooking receptacle having a motor including a drive shaft, a pot stirrer, and a coupling securing the drive shaft and the pot stirrer in driving engagement, said pot stirrer including a main support shaft having feet with pivots pivotally connecting the feet with the support shaft at its opposite ends and spring means being supported on and extended along the length of the support shaft and the feet, the spring means having spring coils for stirring the contents of the cooking receptacle during the rotation of the pot stirrer, the feet being swingable on the pivots to move angularly of the support shaft to enable the effective stirring length of the support shaft and the feet to be varied so the pot stirrer may be used in different sized cooking receptacles, the spring means comprising a compression spring having its opposite ends fixedly secured to said feet with the coils of the spring being adapted to engage the bottom of the cooking receptacle.

3. The pot stirring structure of claim 1 further characterized by a support structure connected to the motor extending radially of the drive shaft and having means for fixedly clamping the components to the side wall of a cooking receptacle, said support structure including means for the vertical and radial adjustment of said means for clamping the components to the side of a cooking receptacle so the pot stirrer may be used for stirring of materials in different sized cooking receptacles.

4. The pot stirring structure of claim 1 further characterized by a support structure including a pair of inner and outer L-shaped plates with the inner L-shaped plate having an inner plate leg fastened to the underside of the motor for supporting the motor thereon, the inner L-shaped plate having a vertical inner plate leg, the outer L-shaped plate having a vertical outer plate leg and releasable means between the vertical legs for fixedly holding the inner and outer plates during the operation of the stirrer and for releasing the plates to permit the outer L-shaped plate to be moved vertically of inner L-shaped plate in accordance with the height of a side wall of a cooking receptacle, the outer L-shaped plate having an outer plate leg, said means for fixedly clamping the support structure to a side wall being borne by the outer plate leg.

5. The pot stirring structure of claim 4 further characterized by the means for clamping the support structure to a side wall of a receptacle including a third L-shaped plate having a radial leg and a pot leg, the radial leg and the outer plate leg having adjustable means securing them together and enabling the third L-shaped plate to be moved radially of the outer L-shaped plate.

6. The pot stirring structure of claim 4 further characterized by the means for clamping the support structure to a side wall of a receptacle including a third L-shaped plate having a radial leg and a pot leg, the radial leg and the outer plate leg having adjustable means securing them together and enabling the third L-shaped plate to be moved radially of the outer L-shaped plate, said pot leg having a spring clip and means securing the clip to the pot leg for clamping a side wall between the clip and a side wall of a cooking receptacle.

7. A pot stirring structure for a cooking receptacle having a motor including a drive shaft, a pot stirrer, and a coupling securing the drive shaft and the pot stirrer in driving engagement, said pot stirrer including a main support shaft having feet with pivots pivotally connecting the feet with the support shaft at its opposite ends and spring means being supported on and extended along the length of the support shaft and the feet, the spring means having spring coils for stirring the contents of the cooking receptacle during the rotation of the pot stirrer, the feet being swingable on the pivots to move angularly of the support shaft to enable the effective stirring length of the support shaft and the feet to be varied so the pot stirrer may be used in different sized cooking receptacles, the pot stirrer further including a vertical shaft coupled at one end with said drive shaft and having an opposite end fixedly secured to the main support shaft midway of its length.

8. A pot stirring structure for a cooking receptacle having a motor including a drive shaft, a pot stirrer, and a coupling securing the drive shaft and the pot stirrer in driving engagement, said pot stirrer including a main support shaft having feet with pivots pivotally connecting the feet with the support shaft at its opposite ends and spring means being supported on and extended along the length of the support shaft and the feet, the spring means having spring coils for stirring the contents of the cooking receptacle during the rotation of the pot stirrer, the feet being swingable on the pivots to move angularly of the support shaft to enable the effective stirring length of the support shaft and the feet to be varied so the pot stirrer may be used in different sized cooking receptacles, said main support shaft and said feet each having its own spring secured in assembly therewith.

9. The pot stirring structure of claim 8 further characterized by said springs each having its opposite ends extended through spring holes thereby securing the springs in assembly with the feet and the main supporting shaft.

10. A pot stirring structure for a cooking receptacle having a motor including a drive shaft with a stirrer connected thereto, and a support structure connected to the motor extending radially of the drive shaft and having means for clamping the same to a side wall of a cooking receptacle, said support structure further including a pair of inner and outer L-shaped plates with the inner L-shaped plate having an inner plate leg operatively connected with the motor for supporting the motor thereon, the inner L-shaped plate having a vertical inner plate leg, the outer L-shaped plate having a vertical outer plate leg and adjustable means between the vertical legs securing the plates together and being adjustable to permit the the outer L-shaped plate to be moved vertically of the inner L-shaped plate in accordance with the height of a side wall of a cooking receptacle, the outer L-shaped plate having an outer plate leg, said means for fixedly clamping the support structure to a side wall being borne by the outer plate leg.

11. A pot stirring structure for a cooking receptacle having components consisting of a central drive shaft, driving means connected to an upper end of said shaft for attachment to a stirrer, and a support structure for the driving means end of the shaft offset radially of the drive shaft, clamping means for fixedly clamping all the components to the side wall of a cooking receptacle, said support structure including means for the vertical and radial adjustment of said clamping means for clamping the components to the side of a cooking receptacle so that the said pot stirrer may be used for the stirring of materials in different sized cooking receptacles, said support structure including a pair of inner and outer generally L-shaped plates with the inner L-shaped plate having an inner plate leg carrying the outer driven end of said shaft, the inner L-shaped plate having a vertical inner plate leg, the outer L-shaped plate having a vertical outer plate leg and adjustable means between said vertical legs securing them together to permit the outer L-shaped plate to be moved vertically of inner L-shaped plate in accordance with the height of a side wall of a cooking receptacle, the outer L-shaped plate having an outer plate leg, to which clamping means are applied.

12. A pot stirring structure for a cooking receptacle having a motor including a drive shaft, a pot stirrer including a vertical shaft and a coupling securing the drive shaft and the vertical shaft of the stirrer in driving engagement, a support structure supporting said motor and having clamp means for fixed attachment with the side wall of a cooking receptacle for supporting said motor thereon, said support structure including means for the vertical and horizontal adjustment of said pot stirrer so that the said pot stirrer may be used for the stirring of materials in different sized cooking receptacles, said pot stirrer further including a generally horizontal rod portion rigidly joined at an intermediate point between its opposite ends with a lower end of said vertical shaft for rotation at all times in a plane at right angles to a vertical shaft axis through said shaft, and a coil spring encircling said rod portion and extending continuously along the length of said rod portion and across said intermediate point with end coils of the coil being secured to said rod only at opposite ends of said rod portions, the intermediate coils of said coil spring flexibly floating on said rod portion opposite said intermediate point for adjustably conforming to and contacting the bottom of a pot along the entire length of the rod portion for scraping the same.

References Cited in the file of this patent

UNITED STATES PATENTS

| | | |
|---|---|---|
| 1,167,536 | Tokheim | Jan. 11, 1916 |
| 1,255,356 | Trust | Feb. 5, 1918 |
| 1,366,777 | Flowers | Jan. 25, 1921 |
| 2,376,722 | Podell | May 22, 1945 |
| 2,563,941 | Krasberg | Aug. 14, 1951 |
| 2,637,537 | Ernst | May 5, 1953 |
| 2,644,412 | Byberg | June 9, 1953 |